June 20, 1972
A. C. GUNTER
3,671,273
APPARATUS FOR PREPARING A COCOA CONCENTRATE
Filed May 20, 1968
2 Sheets-Sheet 1
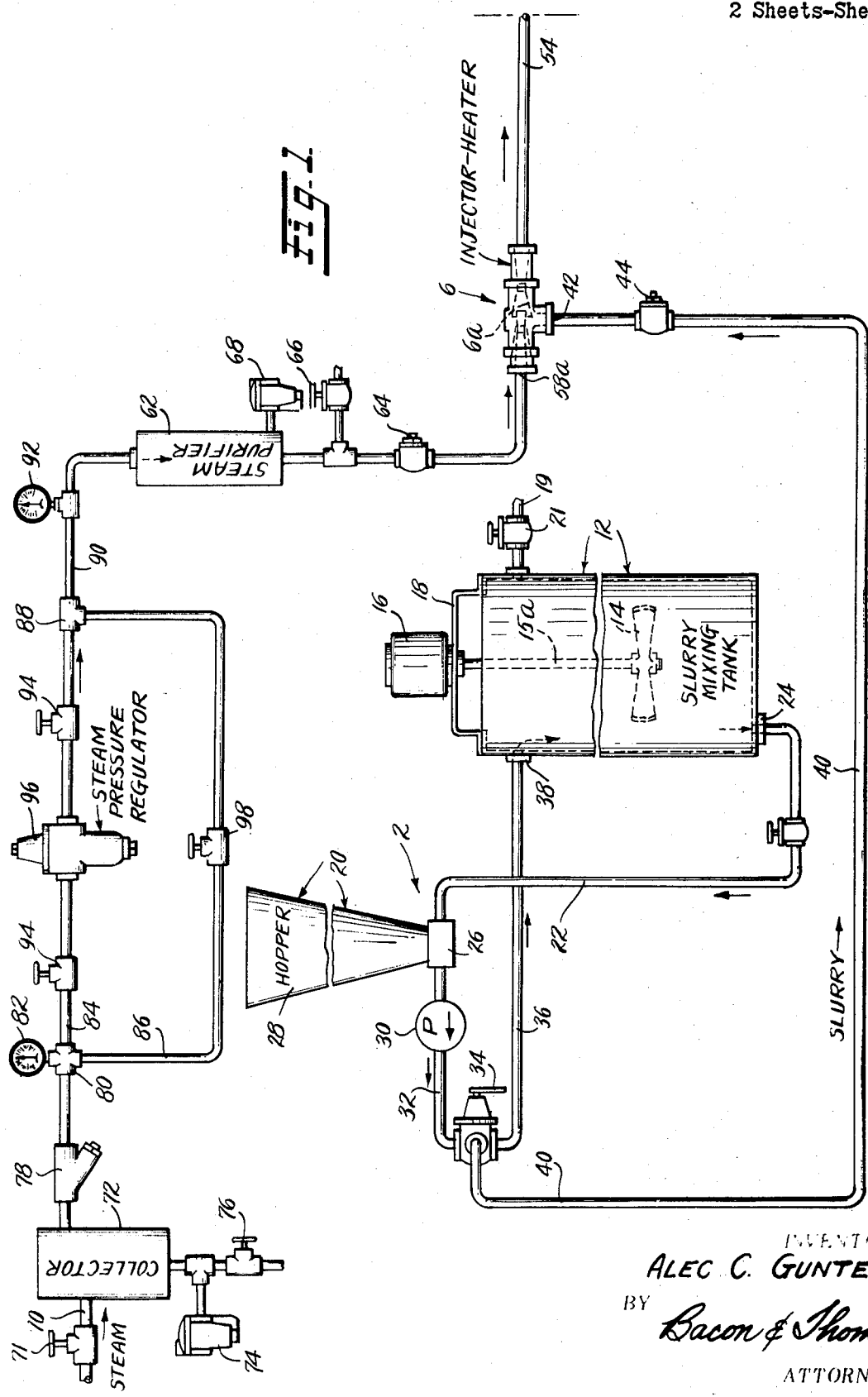
INVENTOR
ALEC C. GUNTER
BY
Bacon & Thomas
ATTORNEYS

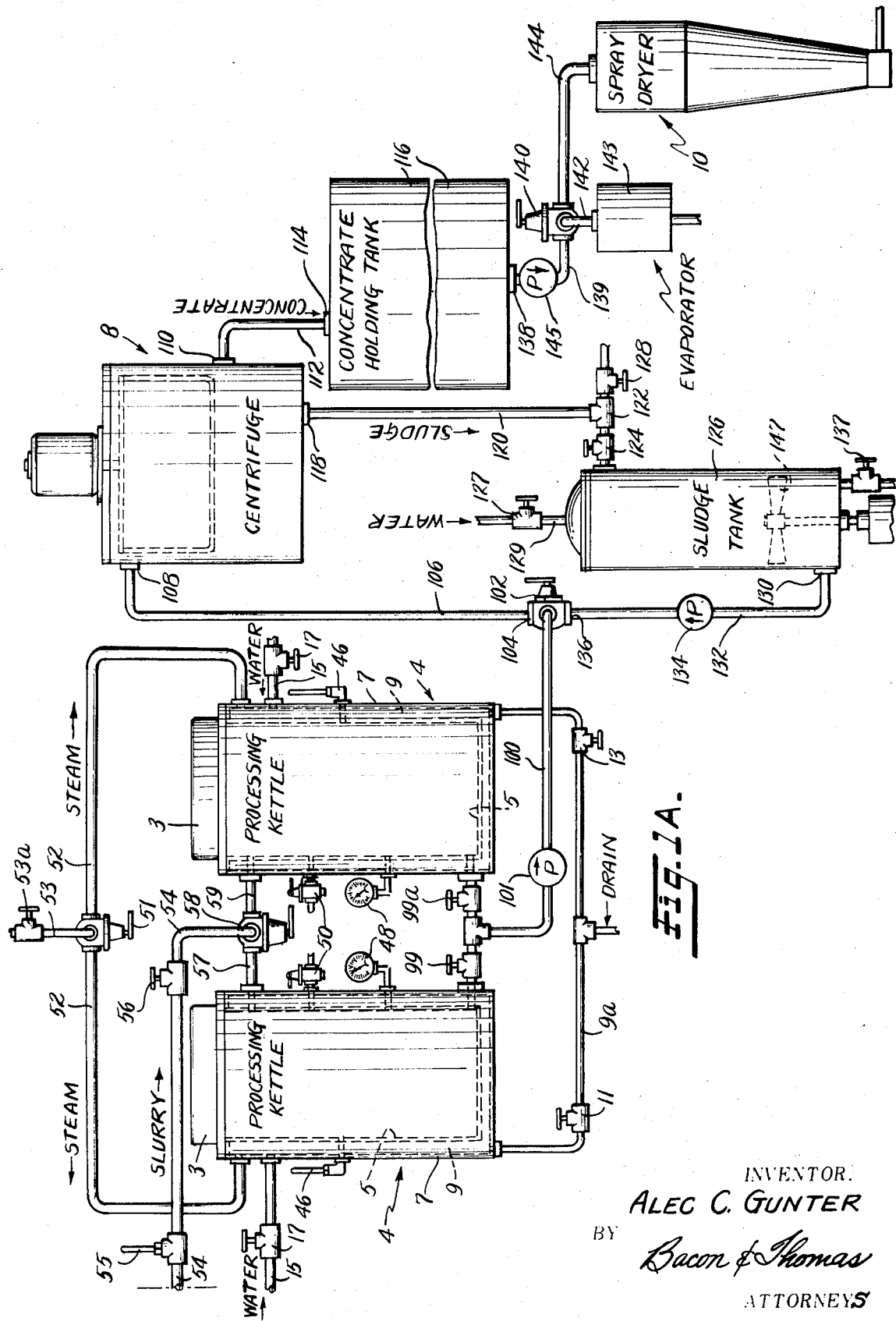

United States Patent Office
3,671,273
Patented June 20, 1972

3,671,273
APPARATUS FOR PREPARING A COCOA CONCENTRATE
Alec C. Gunter, Clear Brook, Va. 22624
Filed May 20, 1968, Ser. No. 730,359
Int. Cl. A23g 1/00, 1/04, 7/00
U.S. Cl. 99—236 CC                    8 Claims

ABSTRACT OF THE DISCLOSURE

A cocoa concentrate for making sediment-free chocolate beverages is prepared with an apparatus comprising means for heating a slurry to a temperature higher than the boiling temperature of water; a processing kettle to receive the slurry from the heating means and constructed to subject the slurry to heating under pressure and agitation, and to cool the heated slurry; and centrifuge means to receive the cooled slurry from the processing kettle.

---

The concentrate is made by forming a slurry comprising a mixture of water and ingredients including liquid milk or liquid milk substitute, cocoa and sugar. A given quantity of water at a temperature above 160° F., for example 180° F., is introduced into a mixing tank, and the dry ingredients are preferably premixed and placed in a mixing hopper connected with the mixing tank in a circulating system wherein a pump withdraws the hot water from the mixing tank, entrains the mixed dry ingredients from the hopper and returns the slurry thus formed to the mixing tank. The mixture in the tank is continuously agitated and the circulating pump is operated to further blend and dissolve the ingredients until a uniform slurry has been produced having a final temperature of about 160° F.

The heated slurry is then withdrawn from the mixing tank and pumped through a stream injection heater device which combines purified dry steam with the slurry to substantially instantaneously heat the 160° F. slurry to a temperature of about 250° F. and to deliver the slurry to a steam heated processing kettle wherein it is preferably maintained at a temperature of about 241° F. to about 255° F. and preferably 248° F. for a period of about 15 to 20 minutes and preferably 18 minutes, under a pressure of about 30 p.s.i.g. to effect sterilization and flavor extraction. Thereafter, the processing kettle is quickly water-cooled to drop the temperature of the slurry to about 180° F. to 185° F. After cooling, any pressure remaining in the kettle can be released without danger of loss of flavor due to flashing. The thus cooled slurry is then passed through a centrifuge, which removes the cocoa fibers, cocoa butter and other solids therefrom to provide a full flavored cocoa syrup concentrate. The syrup concentrate separated from the sludge is discharged from the centrifuge and flows to a concentrate holding tank.

The solid matter, or sludge, from the centrifuge is delivered to and collected in a sludge tank, to which water is later added and the sludge and water agitated for recirculating the same through the centrifuge to further extract chocolate and sugar solution that adhered to the solids. After being recirculated, the sludge is discarded. A recovery of about 6 to 7% of the flavoring constituents is thus achieved. The recovered matter discharged from the centrifuge flows to the holding tank. The recirculation step concludes the processing of the batch of slurry, and the concentrate may be withdrawn from the holding tank, its pH adjusted to 6.7 to 6.8, and vanillin and salt added for further flavoring, rendering it ready for use, or packaging in suitable containers. If necessary, the chocolate flavored syrup from the holding tank can be pumped into an evaporator to remove excess water to give the syrup a Brix number of 62°. Alternatively, the syrup can be pumped into a spray dryer to produce a powdered cocoa concentrate, which may be further treated for proper pH value and added flavoring, the same as the liquid concentrate.

BACKGROUND OF THE INVENTION

(1) Field of the invention

The present invention relates generally to cocoa concentrates for making chocolate-flavored beverages, and to a process and apparatus for making the same.

More particularly, the invention relates to a cocoa concentrate from which cocoa fibers, cocoa butter and substantially all solids have been removed, and to a controlled sedimentation process and apparatus for making the concentrate.

The invention further relates to a chocolate-flavored beverage that is free from the objectionable sedimentation found in prior chocolate-flavored beverages.

(2) Description of the prior art

The present invention is particularly concerned with chocolate-flavored soft drinks prepared for bottling in clear glass bottles, although it is equally applicable to other chocolate-flavored beverages, such as dietary food preparations. The bottler of a chocolate-flavored beverage put up in clear bottles is necessarily concerned with the appearance of the product, especially after even short periods of storage in a warehouse or retail outlet. Common problems in the past with bottled chocolate-flavored beverages have been the tendency for the beverage to form rings or surface flocculation of solids, stratification of solids in layers, and excessive sedimentation at the bottom of the bottle, when left standing for a few hours or for longer periods. There have been previous efforts made to solve these problems through the use of additives in the concentrate, such as stabilizers, thickening agents, wetting agents, and the like, but their use is undesirable and frequently ineffective.

The principal objection to the use of such additives is the extreme care that must be taken during manufacture to ensure that ingredient ratios are precise and processing temperatures are exactly maintained. A small variation in either the ingredient ratio or the processing temperature can defeat or seriously hamper the effectiveness of the additives to control sedimentation and like effects.

There is thus a need for a cocoa concentrate that can be easily manufactured, and which will eliminate sedimentation, settling, wheying off and unsightly surface flocculation in a chocolate-flavored beverage made therefrom, and which eliminates the use of stabilizers, wetting agents and like additives. The present invention meets these requirements.

SUMMARY OF THE INVENTION

The cocoa concentrate of the present invention is manufactured from a blended mixture comprising about 68% water, about 25% skim milk or a milk substitute, about 5% cocoa and about 2% sugar, by weight. While the proportions of the ingredients can be varied somewhat within reasonable limits, it has been found that the proportions given are preferred and provide an ideal concentrate that can be used to make a chocolate beverage with excellent flavor and no sedimentation problem.

The ingredients are first thoroughly blended, using a hopper or funnel-type mixing device and a stainless steel mixing tank, connected by stainless steel piping with a centrifugal pump. The mixing of hot water with the solids forms a slurry, which is agitated in the mixing tank and is recirculated by the pump until all of the solids that can be placed in solution are completely dissolved. The slurry at a temperature of about 160° F. is then pumped through an injector-heater to a processing kettle, the heater being supplied with purified dry steam and being constructed to instantaneously raise the temperature of the slurry to about 250° F. before it is introduced into the processing kettle.

The processing kettle is steam jacketed and is designed to maintain the slurry at a temperature preferably at about 248° F. and under a pressure of about 30 p.s.i.g. The kettle is equipped with an agitator that slowly stirs the slurry during the sterilizing or heat treatment step. The treatment period lasts for about 18 minutes. After the cycle is completed, the slurry is quickly cooled while still in the processing kettle to about 180° F. to 185° F. and is then passed through a centrifuge or clarifier. Cooling is effected by cutting off the steam supply to the kettle jacket, exhausting the steam and then circulating cooling water through the kettle jacket.

The centrifuge is adjusted to remove substantially all cocoa fiber, coca butter and other solids from the slurry, to leave a concentrated syrup or liquor free of solids that might settle out or sedimentate in a chocolate-flavored beverage made from the concentrate. The removed solids are collected in a sludge tank and preferably mixed with water and recycled through the centrifuge, to recover additional chocolate and sugar solution from the solids. The solids-free syrup from the centrifuge is collected in a holding tank. The syrup, after adjusting its Brix value to 62°, if necessary, and adding some vanillin and salt thereto to flavor the same, as per conventional practice, and adjusting the pH to about 6.7 to 6.8, can be used immediately or packed for shipment to bottlers or other users.

The pH of the concentrate is adjusted to the value stated by adding known materials used for this purpose, such as "AC Crystals," "calcium oxide" and/or "magnesium oxide." The specific gravity of the concentrate can be increased, if desired, by adding sugar thereto. Or, its Brix value can be adjusted to 62° by passing it through an evaporator to remove excess water, if necessary.

Alternatively, the syrup concentrate can be pumped to a combination evaporator-spray dryer, such as is used to manufacture non-fat dry milk, wherein it is dehydrated and reduced to a powder.

The syrup concentrate or cocoa powder concentrate produced by the process and apparatus of the invention is substantially free of cocoa fibers, cocoa butter, and other solids, and can be used to make a most flavorful beverage that is free of sedimentation and other incidental objections. Because stabilizers and other additives are eliminated, together with the need for precise and rigid control over ingredient ratios and processing temperature and conditions, and because bottled chocolate beverages made from the present concentrate do not require sterilization in a retort, the invention is an improvement over cocoa concentrates of the past, and over the processes and apparatus used to produce such prior concentrates.

It is an object of the present invention to provide a cocoa concentrate for use in making chocolate-flavored beverages that are free of sedimentation, settling, wheying off and unsightly surface flocculation, even after prolonged periods of storage.

Another object is to provide a cocoa concentrate that is substantially free of cocoa fibers, cocoa butter, and other solids, and which can be used and/or packaged either as a syrup or liquor, or a dry powder.

A further object is to provide a cocoa syrup concentrate that can be dispensed at soda fountains, in coin-operated dispensers, etc., to make a chocolate-flavored drink without danger of clogging tubes, valves, dispensing orifices, etc.

Yet another object is to provide a process and apparatus for manufacturing a sterile cocoa concentrate that is substantially free of cocoa fibers, cocoa butter, and other solids for use in making a chocolate-flavored drink that is not subject to settling, sedimentation or flocculation, and which eliminates the unsightly residue normally present in bottles used for chocolate drinks.

Still another object is to provide a chocolate-flavored beverage that is free from stratification and sedimentation.

A still further object is to provide a process and apparatus for making a non-sterile concentrate, if such is desired, which, nevertheless, can be used in bottling sedimentation-free chocolate-flavored beverages.

Other objects and many of the attendant advantages of the invention will be readily apparent from the following description of the preferred embodiment, when taken together with the accompanying drawings.

DESCRIPTION OF THE DRAWINGS

FIGS. 1 and 1A are schematic views which, taken together, show the apparatus for blending the ingredients of the present concentrate into a slurry, substantially instantaneously heating the slurry to avoid flavor impairment, for processing the slurry under pressure and high temperature to completely sterilize the slurry, and centrifuging the slurry to produce a concentrate or syrup, and/or dehydrating the syrup to produce a concentrate powder mix.

DESCRIPTION OF THE PREFERRED EMBODIMENT

Referring now to the drawings, the system of the present invention includes blending apparatus 2 for blending the ingredients of the concentrate into a slurry, a pair of processing kettles 4 for alternate use in treating batches of the slurry, a steam injector-heater unit 6 for instantaneously heating the slurry before it is introduced into either of the processing kettles 4, a centrifuge 8 for clarifying the treated slurry from either of the kettles 4, a sludge tank 126 for solids removed by the centrifuge 8, a holding tank 116 for solids-free concentrate from the centrifuge 8, an evaporator 143, and a combination evaporator-spray dryer unit 10 for reducing the liquid syrup concentrate to a powder state, if desired.

The blending apparatus 2 includes an open-top, cylindrical, stainless steel mixing tank 12, equipped with an agitator 14 mounted on a shaft 15a driven by a motor 16 supported on a bracket 18 extending across the tank. Hot water at a temperature above 160° F., i.e., 180° F. or sufficiently high to produce a resultant slurry of about 160° F., is supplied to the tank 12 through a pipe 19 containing a shut-off valve 21. A conventional hopper or bin mixer 20 is connected by a conduit 22 to an outlet 24 in the lower end of the mixing tank 12, the mixer 20 including a mixing chamber 26 at its lower end through which water from the conduit 22 flows at high velocity, and a frusto-conical bin or hopper 28 into which the cocoa powder, sugar and dry milk powder or milk substitute are placed to be entrained by and dissolved in the water.

A high speed centrifugal pump 30 is installed downstream of the mixer 20, the inlet of the pump being connected by a conduit 32 to the outlet of the mixing chamber 26. The outlet of the pump 30 is connected to one port of a 3-way valve 34 by the conduit 32. A conduit 36 connects a second port of the valve 34 to an inlet 38 at the upper end of the mixing tank 12, and the third port of the valve 34 is connected by a conduit 40 to the slurry inlet 42 of the steam injector-heater 6. A check valve 44 is connected in the conduit 40, to prevent flow in a reverse direction from the injector-heater 6 toward the valve 34. Thus, a continuous, high velocity, circulating system is provided for mixing the slurry.

In order to blend the ingredients of the cocoa concentrate, a measured quantity of water at above 160° F., say 180° F. or higher, is first admitted into the mixing tank 12, and the corresponding quantities of the dry cocoa, sugar, and powdered milk or powdered milk substitute are placed in the hopper 28. These dry ingredients may be pre-mixed before dumping into the hopper 28. The valve 34 is adjusted to provide for flow only between the conduits 32 and 36. The circulating pump 30 and the agitator motor 16 are then started. The high speed pump 30 draws water at high velocity through the mixing chamber 26 beneath the hopper 28, wherein it picks up the dry ingredients by entrainment. The water and the entrained materials are drawn into the centrifugal pump 30, wherein mixing and dissolving of the dry ingredients in the hot water is facilitated. The liquid mix or slurry is then pumped through the conduit 36 to the mixing tank 12, from where recirculation occurs. Recirculation of the liquid is continued so long as necessary and until all of the soluble ingredients initially placed in the hopper 28 enter into solution, to form a uniform slurry. The ultimate temperature of the slurry is preferably about 160° F.

While the proportions of the ingredients constituting the slurry can be varied within reasonable limits, it has been found that very good results can be obtained with a slurry comprising the ingredients and proportions by weight, as follows:

| | Percent |
|---|---|
| Water | —68 |
| Liquid milk or liquid milk substitute | —25 |
| Cocoa powder | —5 |
| Sugar | —2 |

It is to be understood that in practicing the present invention, whole milk, cream, skim milk, non-fat dry milk, filled milks, imitation milk products, soybean milk, etc., can be used in preparing the present concentrate.

The processing kettles 4, FIG. 1A, are identical and are of any commercially available type utilizing a removable cover 3, and an inner vessel 5 with a jacket 7 about its side and bottom walls forming a jacket space 9 for receiving steam, or cooling water, depending upon whether the kettle is to be used for heating the slurry, or the slurry in the kettle is to be cooled. The kettles 4 are each equipped with a thermometer 46, a steam pressure gauge 48 and a safety pressure-relief valve 50, all communicating with the inner vessel 5. Each kettle 4 contains a low speed, scraper-type agitator (not shown) designed to keep constantly agitated the slurry undergoing treatment in the kettle. Steam can be selectively supplied to the jacket space 9 of the kettles 4 through a three-way valve 51 and conduits 52. Steam is supplied to the valve 51 from a steam supply pipe 53 containing a shut-off valve 53a. The kettles 4 are each designed to keep the slurry being heated under about 30 p.s.i.g. pressure and at a temperature of about 248° F., the amount of steam supplied being controlled by adjusting the valve 53a. Water is supplied to the jacket spaces 9 to cool the kettles 4, through pipes 15 each containing a valve 17. Water or steam can be released from the jacket spaces 9 through a vent pipe 9a by opening valve 11 or 13 connected therein.

The slurry is delivered to the injector-heater 6 through the conduit 40 by operating the pump 30 and adjusting the valve 34 to interconnect the conduit 32 and 40. The slurry is thus pumped out of the mixing tank 12 for further processing. The slurry is selectively supplied to either of the kettles 4 from the injector-heater 6, through a conduit 54 having a thermometer 55 and a shut-off valve 56 mounted therein. The conduit 54 is connected with the inlet of a 3-way valve 58 arranged to selectively direct slurry into either of the vessels 5 through conduit 57 or 59. The injector-heater 6 is preferably of a commercially available type utilizing steam capable of flash-heating the 160° F. slurry entering the injector-heater 6 from the conduit 40 substantially instantaneously to a temperature of about 250° F. The quick heating of the slurry avoids "burning" of the milk and flavor impairment. A suitable steam injector-heater unit 6 is manufactured by the Cherry-Burrel Corporation, of Chicago, Ill., and is identified as the "U.H.T. Heater." However, any other suitable heater can be used, which is preferably designed to direct an annular stream of the slurry product inwardly upon the stream of steam issuing from a converging-diverging set of nozzles 6a mounted within the heater.

The injector-heater 6 includes a steam inlet 58a to which a dry steam supply conduit 60 is connected, leading from the outlet of a conventional steam purifier 62 through a check valve 64 designed to prevent reverse steam flow. A blow-down valve 66 is also connected in the conduit 60, between the steam purifier 62 and the check valve 64. The purifier 12 is equipped with a steam trap 68.

Steam is supplied to this portion of the system from a conduit 70 having a shut-off valve 71 connected to a collector 72 equipped with a steam trap 74 and a blow-down valve 76. Steam flows from the collector 72 through a strainer 78 to a four-way fitting 80, to one leg of which is attached a steam pressure gauge 82. A pair of conduits 84 and 86 leads from the four-way fitting 80 to two legs of a T-fitting 88, the third leg of the fitting 88 being connected by a conduit 90 to a steam pressure gauge 92 and to the inlet of the steam purifier 62.

The conduit 84 has a pair of valves 94 mounted therein, between which a pressure regulator 96 is positioned. The pressure regulator 96 is adjusted to provide steam at the proper pressure and temperature to effect the flash-heating of the slurry in the injector-heater 6 to about 250° F. The conduit 86 functions as a by-pass for the regulator 96, and contains a by-pass shut-off valve 98. Thus, provision is made for supplying steam at a higher pressure to the purifier 62, if desired.

From the kettles 4 the slurry flows under the control of either valve 99 or 99a, through a conduit 100 containing a pump 101, to the inlet of a three-way valve 102, one outlet 104 of which is connected by a conduit 106 with the inlet 108 of a conventional centrifuge or clarifying unit 8. The clarified liquid outlet 110 of the centrifuge 8 is connected by a conduit 112 to the inlet 114 of a holding tank 116, and the waste outlet 118 of said centrifuge is connected to a conduit 120.

The conduit 120 leads to the center leg of a pipe-T 122, one side leg of the T being connected through a valve 124 with the inlet of a sludge tank 126. A drain valve 128 is connected to the remaining leg of the pipe-T 122. The sludge tank 126 has an outlet 130 in its lower end connected by a conduit 132 through a pump 134 to the remaining port 136 of the three-way valve 102. A drain valve 137 is connected to the bottom of the sludge tank 126.

The holding tank 116 receives the centrifuged cocoa concentrate syrup, and has an outlet 138 connected to a conduit 139 to which a three-way valve 140 is connected. The valve 140 is arranged to either direct the syrup concentrate through an outlet tube 142 to an evaporator 143, or to direct it through a conduit 144 to the combination evaporator spray-dryer unit 10. The unit 10 can be any commercially available type utilized for making powdered milk, for example, and reduces the liquid syrup concentrate to powdered form. A pump 145 connected in the pipe 139 will pump the concentrate to either the evaporator 143 or the spray-dryer 10, depending upon the adjustment of the valve 140.

In practicing the process of the invention, the ingredients are first blended by the blending apparatus 2 in the manner described hereinabove, utilizing water (with or without milk added) above 160° F. When the blending cycle is completed, dry, purified steam is supplied to the injector-heater 6 and the valve 34 is manipulated to direct the slurry into the conduit 40 for flow to said heater unit 6. The pressure of the steam supply to the heater unit 6 is pre-adjusted by setting the pressure regulator 96. The steam flows at high velocity through the venturi nozzles 6a of the heater 6. The mixing chamber of the heater 6 insures that every particle of the slurry supplied through the conduit 40 is instantaneously raised to a temperature of about 250° F. The steam traps 74 and 68 insure that dry steam will be delivered to the injector-heater 6. These traps can be blown down whenever necessary by opening the valves 76 and 66.

Instantaneous initial heating of the slurry to a high temperature is desirable to avoid heat damage and flavor impairment, and to raise the temperature of the slurry to near that at which it will be treated in the sterilizing kettles 4. By instantly heating the slurry, possible heat damage and flavor losses that might occur during a prolonged period of heating to the desired temperature cannot occur. In addition, processing time is reduced by the flash-heating.

The kettles 4 are utilized one at a time, with selection made by adjusting the three-way valve 58. Before introducing the slurry and placing the kettles 4 in operation, all steam lines to the jackets 9 of the kettles 4 are drained and deaerated. This is accomplished by manipulating the three-way steam valve 51 to admit steam successively into the jackets 9 and by opening the vent valve 11 or 13 until live steam is seen to discharge from the vent pipe 9a. Thereafter, the valve 11 or 13 is closed and steam is then admitted through the conduit 52 to the jacket 9 of the selected kettle 4 to preheat the kettle. A batch of hot slurry is delivered to the kettle 4, which is operated to hold a temperature ranging from a low of about 241° F. to a high of about 255° F., and preferably about 248° F., under about 30 p.s.i.g. for a period of from about 15 to 20 minutes and preferably about 18 minutes. The slurry is constantly agitated during the processing cycle by a scraper-type agitator (not shown) within the kettle 4.

The temperature within the kettle should be held within the range given. If it falls below about 241° F., the desired processing and sterilization of the slurry will not be satisfactorily effected. At temperatures above about 255° F., the slurry will be burned and its flavor will be adversely affected. Ideally, a temperature of 248° F. has been found to give the best results.

When the sterilizing cycle in the kettle 4 is complete, the steam to the kettle in use is turned off and the pressure is relieved through the vent valve 11 or 13. Water is then admitted to the jacket space 9 through the conduit 15 upon opening valve 17, to quickly cool the slurry to about 180° F. to 185° F., which has been found to be the temperature range at which cocoa fibers and cocoa butter are best removed from the slurry by the centrifuge 8. Cooling water discharge from the jacket space 9 is controlled by adjusting the valve 11 or 13 to obtain maximum heat transfer and quick cooling of the slurry.

When the slurry is at the proper reduced temperature, the valve 50 is manually opened to relieve any pressure in the kettle 4. The valve 99 or 99a is then opened, depending upon which kettle is being used, and the valve 102 is operated to connect the conduit 100 to the conduit 106 leading to the centrifuge unit 8, the pump 101 is started, and the centrifuge 8 is placed in operation. The pump 101 delivers the slurry to the centrifuge 8, which functions to remove all cocoa fiber, cocoa butter and any other solids from the slurry. Such solids are periodically and automatically drawn off as sludge through the conduit 120 to collect in the sludge tank 126. The valve 124 is open at this time, and the valve 128 is closed. Solids-free syrup or liquid concentrate flows from the centrifuge 8 through the conduit 112 to the holding tank 116.

The liquid concentrate in the holding tank 116 can be utilized to form a liquid syrup suitable for use by a bottler to make chocolate-flavored beverages, or it can be reduced to a powder form. In the first instance, the concentrate is pumped from the holding tank 116 by pump 145 to the three-way valve 140 and conduit 142, and is run through a suitable evaporator 143 to remove sufficient water so that a finished Brix of about 62° is obtained. The pH of the syrup concentrate is then adjusted to about 6.7 to 6.8, as previously described. Vanillin and salt, to flavor, are added according to the taste desired and the concentrate is then ready for use or packaging.

If a powdered concentrate is desired, the three-way valve 140 is operated to have the pump 145 supply the concentrate from the holding tank 116 under pressure to the combination evaporator-spray dryer unit 10. The liquid is converted to powder in the unit 10, and the pH of the powder concentrate is adjusted to about 6.7 to 6.8. After adding the flavoring elements, the powder is ready for use or packaging.

The entire process from the kettles 4 to the holding tank 116 is carried out in a closed system, so that the sterility of the product leaving the kettles 4 is maintained. The packaged concentrate, in either its syrup or powdered form, can be used to make chocolate-flavored beverages, either carbonated or non-carbonated, which beverages will be free of sedimentation and like problems.

It has been found that a certain amount of chocolate flavor and sugar solution may adhere to the cocoa fibers initially removed from the slurry by the centrifuge 8, causing a resultant slight flavor loss in the cocoa concentrate. Nearly all of this flavor can be recovered by reprocessing the sludge collected in the sludge tank 126 through the centrifuge 8, after emtpying the kettle 4.

To reprocess the sludge in the tank 126, the valve 124 is closed and the valve 128 is opened. The three-way valve 102 is operated to close the pipeline 100, and to open communication between the conduits 132 and 106. Hot water at a temperature of about 180° F. to 185° F., to dilute the sludge, is then admitted to the sludge tank 126 through the conduit 129 and flow control valve 127. A high speed agitator 147 in the sludge tank 126 mixes the water and sludge for easy pumping to the centrifuge 8.

The pump 134 is then energized, and functions to pump the diluted sludge to the centrifuge 8. The centrifuge 8 separates the cocoa fibers, cocoa butter and other solids from the liquid, the latter taking into solution the last of the chocolate-flavoring and sugar solution carried by the solids and passing from the centrifuge into the holding tank 116. The reprocessed solids are then discarded to drain through the valve 128.

When all of the sludge has been reprocessed, the pump 134 is stopped, the valve 128 is closed, valve 124 is opened, and the valve 102 is adjusted to reestablish continuity between the conduits 100 and 106. The batch of liquid concentrate in the holding tank 116, which includes both the concentrate removed from the slurry and the chocolate-flavored liquid removed by reprocessing the sludge, is then passed on to the finishing operation in either the evaporator 143 or spray-dryer 10 for producing cocoa concentrate in liquid or powder form. A second batch of slurry can be mixed and started through the cycle before the first batch has been completed by routing it to the other kettle 4, and then passing it through the centrifuge 8. Thus, the present apparatus makes possible a continuous batch-type process for making cocoa cencentrate.

Obviously, procedural modifications and structural variations of the present invention are possible, within the scope of the above teachings.

I claim:

1. Apparatus for making cocoa concentrate from a slurry of water, milk or a milk substitute, cocoa, and sugar, comprising: heater means for substantially instantly heating the slurry to a temperature higher than the boiling temperature of water; at least one processing kettle connected to receive the slurry from said heater means, and constructed and arranged to subject said slurry to a temperature between about 241° F. to 255° F. under pressure and constant agitation for a selected period of time and thereafter cooling the slurry to a temperature of about 180° F. to 185° F.; and centrifuge means connected to receive the cooled slurry from said processing kettle for removing cocoa fibers and cocoa butter from said slurry to produce a solids-free cocoa liquid concentrate.

2. Apparatus as recited in claim 1, including additionally, means connected with said centrifuge means for receiving and spray-drying said cocoa liquid concentrate, to reduce said concentrate to a powder form.

3. Apparatus as recited in claim 1, wherein the heater means is constructed and arranged to flash-heat the slurry to about 250° F.

4. Apparatus as recited in claim 1, including additionally, means connected in advance of the heater means for blending water, milk or a milk substitute, cocoa and sugar to form the slurry.

5. Apparatus for making a cocoa concentrate for a sediment-free chocolate flavored beverage or the like, comprising: a hopper for receiving the dry ingredients for the concentrate, said hopper having a mixing chamber; a mixing tank for receiving the liquid for the concentrate; pipe means interconnecting said mixing tank with said mixing chamber and forming a slurry circulating system therebetween; a pump connected in said pipe means arranged to withdraw liquid from said mixing tank for flow through said mixing chamber and return to said mixing tank, whereby the dry ingredients are entrained by the liquid as it flows through said mixing chamber to form a slurry; an injector-heater; conduit means connecting said slurry circulating system with said injector-heater; means connected in said slurry circulating system operable to direct slurry therefrom into said conduit means for flow to said injector-heater, said injector-heater having an inlet port for receiving steam for quickly heating the slurry as it enters said injector-heater; a processing kettle having an inner vessel, a jacket, and a space between said vessel and jacket; conduit means connected to deliver heated slurry from said injector-heater to said inner vessel means for selectively admitting steam or cooling water into said space to heat or cool slurry in said processing kettle; a centrifuge for removing solids from said slurry to produce a solids-free liquid concentrate; conduit means connected to deliver slurry from said processing kettle to said centrifuge; a holding tank; conduit means connected to deliver the solids-free liquid concentrate from said centrifuge to said holding tank; a sludge tank for the solids removed from said slurry by said centrifuge; and conduit means connected to deliver said solids from said centrifuge to said sludge tank.

6. Apparatus as recited in claim 5, including a pump and conduit means for recirculating sludge from the sludge tank back to the centrifuge.

7. Apparatus as recited in claim 5, including an evaporator connected with the holding tank for receiving concentrate therefrom and removing any excess water from said concentrate.

8. Apparatus as recited in claim 5, including a spray-dryer connected with the holding tank for receiving concentrate therefrom and converting it to a powder.

References Cited
UNITED STATES PATENTS

| | | | |
|---|---|---|---|
| 1,714,597 | 5/1929 | Grindrod | 99—212 |
| 1,849,030 | 3/1932 | Zern et al. | 99—25 |
| 1,857,430 | 5/1932 | Clark | 99—23 |
| 1,993,511 | 3/1935 | Grindrod | 99—25 |
| 2,117,682 | 5/1938 | Sanna | 99—25 |
| 2,585,767 | 2/1952 | Guggenheim et al. | 99—236 |
| 3,226,237 | 12/1965 | Magnino | 99—25 X |

LIONEL M. SHAPIRO, Primary Examiner

D. M. NAFF, Assistant Examiner

U.S. Cl. X.R.

99—23, 25